: US 10,459,603 B2
(45) Date of Patent: *Oct. 29, 2019

(54) EXTENSION ACTIVATION FOR RELATED DOCUMENTS

(71) Applicant: Microsoft Technology Licensing, LLC, Redmond, WA (US)

(72) Inventors: David Claux, Redmond, WA (US); Jason Todd Henderson, Tacoma, WA (US); Andrew Salamatov, Seattle, WA (US); Oleg Ouliankine, Redmond, WA (US); Warren Randall Byrne, Esparto, CA (US); Michael Anthony Faoro, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/232,993

(22) Filed: Aug. 10, 2016

(65) Prior Publication Data

US 2016/0349950 A1    Dec. 1, 2016

Related U.S. Application Data

(63) Continuation of application No. 13/361,097, filed on Jan. 30, 2012, now Pat. No. 9,449,112.

(51) Int. Cl.
*G06F 3/0482* (2013.01)
*G06F 16/958* (2019.01)
(Continued)

(52) U.S. Cl.
CPC .......... *G06F 3/0482* (2013.01); *G06F 16/986* (2019.01); *G06F 17/2235* (2013.01); *H04L 51/046* (2013.01); *G06Q 10/00* (2013.01)

(58) Field of Classification Search
CPC ... G06F 3/0482; G06F 17/2235; G06F 16/986
See application file for complete search history.

(56) References Cited

U.S. PATENT DOCUMENTS 5,349,658 A    9/1994    O'Rourke et al.
5,877,757 A    3/1999    Baldwin et al.
(Continued)

FOREIGN PATENT DOCUMENTS

CN    1747402 A    3/2005
CN    1755680 A    4/2006
(Continued)

OTHER PUBLICATIONS

"Getting started with Gmail Contextual Gadgets", Jun. 21, 2010, retrieved from http://pipetree.conn/qmacro/blog/2010/06/21/getting-started-with-gmail-contextual-gadgets/ (Year: 2010).*
(Continued)

*Primary Examiner* — Li P Sun

(57) ABSTRACT

Extension activation may be provided. Upon receiving a new document associated with a plurality of related documents, extension trigger conditions may be evaluated. In response to determining that an extension trigger is satisfied, a user interface element associated with the extension trigger may be displayed.

20 Claims, 4 Drawing Sheets

(51) Int. Cl.
   *G06F 17/22* (2006.01)
   *G06Q 10/00* (2012.01)
   *H04L 12/58* (2006.01)

(56) References Cited

U.S. PATENT DOCUMENTS

| | | |
|---|---|---|
| 5,986,657 A | 11/1999 | Berteig et al. |
| 6,014,666 A | 1/2000 | Helland et al. |
| 6,292,889 B1 | 9/2001 | Fitzgerald et al. |
| 6,408,336 B1 | 6/2002 | Schneider et al. |
| 6,449,643 B1 | 9/2002 | Hyndman et al. |
| 6,530,075 B1 | 3/2003 | Beadle et al. |
| 6,697,942 B1 | 2/2004 | L'Heureux et al. |
| 6,754,896 B2 | 6/2004 | Mishra et al. |
| 6,785,867 B2 | 8/2004 | Shaffer et al. |
| 7,000,230 B1 | 2/2006 | Murray et al. |
| 7,136,843 B2 | 11/2006 | Bigus et al. |
| 7,219,234 B1 | 5/2007 | Ashland et al. |
| 7,233,792 B2 | 6/2007 | Chang |
| 7,243,336 B2 | 7/2007 | Brockway et al. |
| 7,284,191 B2 | 10/2007 | Grefenstette et al. |
| 7,333,956 B2 | 2/2008 | Malcolm |
| 7,360,167 B2 | 4/2008 | Hennum et al. |
| 7,506,263 B1 | 3/2009 | Johnston et al. |
| 7,529,804 B1 | 5/2009 | Lu et al. |
| 7,707,257 B2 | 4/2010 | Taieb et al. |
| 7,765,212 B2 | 7/2010 | Surendran et al. |
| 7,779,027 B2 | 8/2010 | James et al. |
| 7,861,167 B2 | 12/2010 | Fernando et al. |
| 7,912,822 B2 | 3/2011 | Bethlehem et al. |
| 8,010,613 B2 | 8/2011 | Oral et al. |
| 8,024,412 B2 | 9/2011 | McCann et al. |
| 8,074,217 B2 | 12/2011 | James et al. |
| 8,220,007 B1 | 7/2012 | Yeh et al. |
| 8,250,518 B2 | 8/2012 | Averett et al. |
| 8,255,280 B1 | 8/2012 | Kay et al. |
| 8,275,356 B2 | 9/2012 | Hickie |
| 8,315,198 B2 | 11/2012 | Corneille et al. |
| 8,429,286 B2 | 4/2013 | Pantos |
| 8,578,507 B2 | 11/2013 | Faitelson et al. |
| 8,826,455 B2 | 9/2014 | Julisch et al. |
| 8,843,822 B2 | 9/2014 | Claux et al. |
| 8,959,425 B2 | 2/2015 | Ouliankine et al. |
| 9,256,445 B2 | 2/2016 | Claux et al. |
| 2002/0059347 A1 | 5/2002 | Shaffer et al. |
| 2002/0078091 A1 | 6/2002 | Vu et al. |
| 2002/0103824 A1 | 8/2002 | Koppolu et al. |
| 2002/0171671 A1 | 11/2002 | Bou et al. |
| 2003/0126592 A1 | 7/2003 | Mishra et al. |
| 2003/0196172 A1 | 10/2003 | Bates et al. |
| 2003/0236875 A1 | 12/2003 | Green et al. |
| 2004/0003389 A1 | 1/2004 | Reynar et al. |
| 2004/0034860 A1 | 2/2004 | Fernando et al. |
| 2004/0059813 A1 | 3/2004 | Bolder et al. |
| 2004/0117799 A1 | 6/2004 | Brockway et al. |
| 2004/0119745 A1 | 6/2004 | Bartek et al. |
| 2004/0153456 A1* | 8/2004 | Charnock ......... G06F 17/30389 |
| 2004/0243808 A1 | 12/2004 | Ishiguro et al. |
| 2005/0033728 A1 | 2/2005 | James et al. |
| 2005/0044046 A1 | 2/2005 | Ishiguro et al. |
| 2005/0091184 A1 | 4/2005 | Seshadri et al. |
| 2005/0119967 A1 | 6/2005 | Ishiguro et al. |
| 2005/0144000 A1 | 6/2005 | Yamasaki et al. |
| 2005/0144318 A1 | 6/2005 | Chang |
| 2005/0188174 A1 | 8/2005 | Guzak et al. |
| 2005/0229104 A1 | 10/2005 | Franco et al. |
| 2005/0289113 A1 | 12/2005 | Bookstaff |
| 2005/0289535 A1 | 12/2005 | Murray et al. |
| 2006/0004739 A1 | 1/2006 | Anthony et al. |
| 2006/0036725 A1 | 2/2006 | Chand |
| 2006/0036965 A1 | 2/2006 | Harris et al. |
| 2006/0069836 A1 | 3/2006 | Seo et al. |
| 2006/0101053 A1 | 5/2006 | Proctor |
| 2006/0155812 A1 | 7/2006 | Looman |
| 2006/0168136 A1 | 7/2006 | Bethlehem et al. |
| 2006/0173859 A1 | 8/2006 | Kim et al. |
| 2006/0195575 A1 | 8/2006 | Delany et al. |
| 2006/0218488 A1 | 9/2006 | Shah et al. |
| 2007/0011258 A1 | 1/2007 | Khoo |
| 2007/0061401 A1 | 3/2007 | Bodin et al. |
| 2007/0073699 A1 | 3/2007 | Reed |
| 2007/0094408 A1 | 4/2007 | Gundla et al. |
| 2007/0124696 A1 | 5/2007 | Mullender et al. |
| 2007/0136603 A1 | 6/2007 | Kuecuekyan |
| 2007/0156897 A1 | 7/2007 | Lim |
| 2007/0156913 A1 | 7/2007 | Miyamoto et al. |
| 2007/0226204 A1 | 9/2007 | Feldman |
| 2007/0233791 A1 | 10/2007 | Sylthe et al. |
| 2007/0240098 A1 | 10/2007 | Averett et al. |
| 2007/0244987 A1 | 10/2007 | Pedersen et al. |
| 2007/0261066 A1 | 11/2007 | Miyamoto et al. |
| 2008/0033955 A1 | 2/2008 | Fujii |
| 2008/0059463 A1 | 3/2008 | Bauchot et al. |
| 2008/0082907 A1 | 4/2008 | Sorotokin |
| 2008/0109448 A1 | 5/2008 | Aboel-Nil et al. |
| 2008/0109912 A1 | 5/2008 | Rivera |
| 2008/0134162 A1 | 6/2008 | James et al. |
| 2008/0155555 A1 | 6/2008 | Kwong |
| 2008/0189360 A1 | 8/2008 | Kiley et al. |
| 2008/0244440 A1 | 10/2008 | Bailey et al. |
| 2008/0244443 A1 | 10/2008 | Schaw et al. |
| 2008/0250097 A1 | 10/2008 | Angelini et al. |
| 2008/0256107 A1 | 10/2008 | Banga |
| 2008/0271157 A1 | 10/2008 | Faitelson et al. |
| 2008/0294730 A1 | 11/2008 | Oral et al. |
| 2008/0307046 A1 | 12/2008 | Baek et al. |
| 2009/0006201 A1 | 1/2009 | Faseler, Jr. |
| 2009/0031246 A1 | 1/2009 | Cowtan et al. |
| 2009/0044146 A1 | 2/2009 | Patel et al. |
| 2009/0094332 A1 | 4/2009 | Schemers, III et al. |
| 2009/0150981 A1 | 6/2009 | Amies et al. |
| 2009/0164427 A1 | 6/2009 | Shields et al. |
| 2009/0193444 A1 | 7/2009 | Clark et al. |
| 2009/0210800 A1 | 8/2009 | McCann et al. |
| 2009/0265139 A1 | 10/2009 | Klein et al. |
| 2009/0265330 A1 | 10/2009 | Cheng et al. |
| 2009/0293135 A1 | 11/2009 | Nanaumi |
| 2009/0300597 A1 | 12/2009 | George et al. |
| 2009/0307652 A1 | 12/2009 | Maybee et al. |
| 2009/0313554 A1 | 12/2009 | Haynes et al. |
| 2009/0319911 A1 | 12/2009 | McCann et al. |
| 2009/0327352 A1 | 12/2009 | Thomas et al. |
| 2010/0011352 A1 | 1/2010 | Chu et al. |
| 2010/0081417 A1 | 4/2010 | Hickie |
| 2010/0131529 A1 | 5/2010 | Kasera et al. |
| 2010/0153915 A1 | 6/2010 | Schneider |
| 2010/0211989 A1 | 8/2010 | Julisch et al. |
| 2010/0241604 A1 | 9/2010 | Kamani et al. |
| 2010/0257182 A1 | 10/2010 | Saliba et al. |
| 2010/0262557 A1 | 10/2010 | Ferreira et al. |
| 2010/0287525 A1 | 11/2010 | Wagner |
| 2010/0293586 A1 | 11/2010 | Simoes Rodrigues et al. |
| 2010/0318642 A1 | 12/2010 | Dozier |
| 2011/0028138 A1 | 2/2011 | Davies-Moore et al. |
| 2011/0029988 A1 | 2/2011 | Mittel et al. |
| 2011/0072352 A1 | 3/2011 | Tanner et al. |
| 2011/0087984 A1 | 4/2011 | Jitkoff et al. |
| 2011/0093801 A1 | 4/2011 | Koyama et al. |
| 2011/0106736 A1 | 5/2011 | Aharonson et al. |
| 2011/0113450 A1 | 5/2011 | Sharma et al. |
| 2011/0126296 A1 | 5/2011 | Moore |
| 2011/0145749 A1 | 6/2011 | Sailor et al. |
| 2011/0154312 A1 | 6/2011 | Balko et al. |
| 2011/0209159 A1 | 8/2011 | Baratz et al. |
| 2011/0298056 A1 | 12/2011 | Ning et al. |
| 2012/0005155 A1 | 1/2012 | Lynch et al. |
| 2012/0023421 A1 | 1/2012 | Demant et al. |
| 2012/0084644 A1 | 4/2012 | Robert et al. |
| 2012/0089699 A1 | 4/2012 | Cholas |
| 2012/0094719 A1 | 4/2012 | Choi et al. |
| 2012/0144282 A1 | 6/2012 | Loeb et al. |
| 2012/0167123 A1 | 6/2012 | Gavita et al. |
| 2013/0076598 A1 | 3/2013 | Sirpal et al. |
| 2013/0151942 A1 | 6/2013 | Ouliankine et al. |

(56) References Cited

U.S. PATENT DOCUMENTS

| | | | |
|---|---|---|---|
| 2013/0185362 | A1 | 7/2013 | Clagg et al. |
| 2013/0198623 | A1 | 8/2013 | Claux et al. |
| 2013/0198627 | A1 | 8/2013 | Claux et al. |
| 2013/0198647 | A1 | 8/2013 | Claux et al. |
| 2016/0085395 | A1 | 3/2016 | Claux et al. |
| 2017/0243018 | A1 | 8/2017 | Clagg et al. |

FOREIGN PATENT DOCUMENTS

| | | | |
|---|---|---|---|
| CN | 1828529 | A | 9/2006 |
| CN | 101005368 | A | 7/2007 |
| CN | 101315624 | A | 12/2008 |
| CN | 101317150 | | 12/2008 |
| CN | 101317150 | A | 12/2008 |
| CN | 101606155 | A | 12/2009 |
| CN | 102141997 | A | 8/2011 |
| JP | 1166101 | | 6/1989 |
| JP | 2003051851 | | 2/2003 |
| JP | 2006107490 | | 4/2006 |
| JP | 2010165218 | A | 7/2010 |
| JP | 2010-204743 | | 9/2010 |
| JP | 2011-0066101 | | 3/2011 |
| KR | 20030051219 | A | 6/2003 |
| KR | 20110086840 | A | 8/2011 |
| TW | 201118742 | A | 6/2011 |

OTHER PUBLICATIONS

"Changes in Outlook 2010", Retrieved on: Oct. 10, 2011; Updated Sep. 7, 2011; , Available at: http://technet.microsoft.com/en-us/library/cc179110.aspx; © 2011 Microsoft; 12 pgs.

"Extension Plug-ins for Processing Messages", Retrieved on: Oct. 10, 2011, Available at: http://docs.blackberry.com/en/admin/deliverables/25767/Ext_pluins_for_processing_msgs_595319_11.jsp; Administrative Guide—BlackBerry Enterprise Server for Microsoft Exchange; 2 pgs.

"Glovia G2 Web Client—Full Windows Graphical user Interface Client within any Browser Supporting ActiveX" Retrieved on: Oct. 10, 2011, Available at: http://www.glovia.com/pdf/datasheets/GloviaWebClient.pdf; Glovia International, Inc. 2010; 2 pgs.

"Gmail Contextual Gadgets Developer's Guide", Retrieved on: Oct. 17, 2011, Available at: http://code.google.com/apis/gmail/gadgets/contextual/; 1 pg.

Chinese First Office Action dated Mar. 25, 2015 cited in Application No. 201210520996.X, 14 pgs. (w/translation).

Chinese First Office Action dated Sep. 29, 2015 cited in Application No. 201310017749.2, 13 pgs. (w/translation).

Chinese Notice on Grant dated Jan. 13, 2016 cited in Application No. 201210520996.X, 6 pgs. (w/translation).

Chinese Second Office Action dated Jun. 2, 2016 cited in Application No. 201310017749.2, 14 pgs. (with translation).

Cornell; "Developing Smart Tag DLLs"; Apr. 2001; Retrieved from: http://msdn.microsoft.com/library/default.asp?url=/library.en-us/dnsmarttag/html; 8 pgs.

Dejean, et al., "What's new in IBM Lotus Notes and Domino V8", Published on: Mar. 20, 2007, Available at: http://www.ibm.com/developerworks/lotus/library/notes8-new/.

EP Communication dated Jun. 10, 2015 cited in Appln No. PCT/US2012/066691, 10 pgs.

EP Extended Search Report Received in European Patent Application No. 13742862.9, dated Aug. 14, 2015, 8 Pages.

EP Extended Search Report Received in European Patent Application No. 13744376.8, dated Sep. 1, 2015, 9 Pages.

EP Supplementary Search Report Received in European Patent Application No. 13743289.4, dated Jul. 10, 2015, 7 Pages.

European Office Action dated Mar. 22, 2016 in Application No. 13742862.9, 5 pgs.

"Installing Content Collector Notes Client Extension in Silent Mode", Retrieved on: Oct. 10, 2011, Available at: http://publib.boulder.ibm.com/infocenter/email/v2r2m0/index.jsp?topic=%2Fcom.ibm.content.collector.doc%2Finstalling%2Ft_afu_install_nce_silent.htm; last updated Dec. 2010; © IBM Corporation 2010; 1 pg.

"Manage Windows and Panels", Adobe InDesign CS4; Retrieved on: Oct. 10, 2011, Available at: http://help.adobe.com/en_US/InDesign/6.0/WS8599BC5C-3E44-406c-9288-C3B3BBEB5E88.html; 7 pgs.

"RSEMCE_235677.EXE—Remote Storage for Exchange v2.0 Mail Client Extension Install", Retrieved on: Oct. 10, 2011, Available at: http://www.symantec.com/business/support/index?page=content&pmv=print&impressions=&viewlocale=&id=TECH10485; Created: Jan. 3, 2001; Updated: Jan. 3, 2002; © 1995-2008 Symantec Corporation; 3 pgs.

"Spam Filter", Retrieved on: Sep. 26, 2011, Available at: http://www.esoft.com/network-security-appliances/add-ons/spamfilter/; eSoft®; 2 pgs.

"Thunderbird Email Thread Visualizer", Published on: Oct. 11, 2011, Available at: http://www.ghacks.net/2009/08/13/thunderbird-email-thread-visualizer/.

"Window Layout—Thunderbird", Retrieved on: Oct. 7, 2011, Available at: http://kb.mozillazine.org/Window_layout_-_Thunderbird; © 1998-2007 MozillaZine; 8 pgs.

Adams; "Getting Started with Gmail Contextual Gadgets"; DJ's Weblog; Jun. 21, 2010; 8 pgs.

Aery, et al., "eMailSift: Email Classification Based on Structure and Content", In Proceedings of the Fifth IEEE International Conference on Data Mining, Nov. 27-30, 2005, pp. 18-25.

Bekkerman, et al., "Automatic Categorization of Email into Folders: Benchmark Experiments on Enron and SRI Corpora", In CIIR Technical Report IR-418, University of Massachusetts, 2004, pp. 1-23.

Bykov, Vassili, "Hopscotch: Towards User Interface Composition", In Proceedings of International Workshop on Advanced Software Development Tools and Techniques, Jul. 2008, 9 pages.

Chinese First Office Action and Search Report Issued in Patent Application No. 201380007344.9, dated Jun. 24, 2016, 14 Pages. (with translation).

U.S. Appl. No. 13/315,314, Office Action dated Dec. 19, 2013, 21 pgs.

U.S. Appl. No. 13/315,314, Office Action dated Mar. 15, 2013, 20 pgs.

U.S. Appl. No. 13/351,140, Final Office Action dated Feb. 19, 2014, 32 pgs.

U.S. Appl. No. 13/351,310, Office Action dated Aug. 13, 2013 36 pgs.

U.S. Appl. No. 13/351,310, Office Action dated Dec. 18, 2014, 33 pgs.

U.S. Appl. No. 13/351,310, Office Action dated Feb. 26, 2016, 35 pgs.

U.S. Appl. No. 13/351,310, Office Action dated Jun. 29, 2015, 25 pgs.

U.S. Appl. No. 13/361,097, Final Office Action dated Jun. 4, 2014, 27 pgs.

U.S. Appl. No. 13/361,097, Notice of allowance dated May 9, 2016, 22 pgs.

U.S. Appl. No. 13/361,097, Office Action dated Dec. 22, 2014, 31 pgs.

U.S. Appl. No. 13/361,097, Office Action dated Dec. 31, 2015, 44 pgs.

Majid, et al., "NaCIN—An Eclipse Plug-In for Program Navigation-based Concern Inference", In Proceedings of the OOPSLA Workshop on Eclipse Technology eXchange, Oct. 16, 2005, pp. 70-74.

Nedos, et al., "LATTE: Location and Time Triggered Email", In Proceedings of the International Conference on Pervasive Computing and Communications, Jun. 21-24, 2004, pp. 813-819.

PCT International Search Report and Written Opinion for PCT/US2012/066691 dated Feb. 28, 2013; 10 pgs.

PCT International Search Report and Written Opinion for PCT/US2013/020915 dated Apr. 23, 2013, 10 pgs.

PCT International Search Report and Written Opinion for PCT/US2013/022615 dated May 16, 2013, 9 pgs.

PCT International Search Report and Written Opinion for PCT/US2013/022823 dated May 10, 2013, 10 pgs.

(56) References Cited

OTHER PUBLICATIONS

PCT International Search Report and Written Opinion for PCT/US2013/022826 dated May 10, 2013, 11 pgs.
Rex Thexton et al., "A Role-Based Approach to Automated Provisioning and Personalized Portals," Jan. 2011, 7 pgs., http://www.oracle.com/technetwork/articles/role-based-automated-provisioning-213244.html.
Rohall, et al., "Email Visualizations to Aid Communications", In Proceedings of Late-Breaking Hot Topics, IEEE Symposium on Information Visualization, Oct. 2011, pp. 12-15.
U.S. Appl. No. 13/315,314, Final Office Action dated Jun. 17, 2014, 19 pgs.
U.S. Appl. No. 13/315,314, Final Office Action dated Sep. 6, 2013 26 pgs.
U.S. Appl. No. 13/361,097, Office Action dated Jan. 14, 2014, 18 pgs.
U.S. Appl. No. 13/361,097, Office Action dated May 7, 2015, 31 pgs.
U.S. Appl. No. 13/361,140, Notice of Allowance dated Sep. 16, 2015, 5 pgs.
U.S. Appl. No. 13/361,140, Office Action dated Apr. 23, 2015, 28 pgs.
U.S. Appl. No. 13/361,140, Office Action dated Jul. 16, 2013 22 pgs.
U.S. Appl. No. 13/361,140, Office Action dated Oct. 6, 2014, 35 pgs.
U.S. Appl. No. 13/361,219, Final Office Action dated Mar. 3, 2014, 23 pgs.
U.S. Appl. No. 13/361,219, Office Action dated Sep. 10, 2013, 33 pgs.
Chinese Notice of Allowance in Application 201380007344.9, dated Aug. 10, 2017, 4 pages.
Chinese Notice of Allowance in Application 201380007338.3, dated May 26, 2017, 4 pages.
Japanese Notice of Allowance in Application 2014-555578, dated Mar. 2, 2017, 4 pages.
Chinese 3rd Office Action in Application 201380007344.9, dated Apr. 19, 2017, 6 pages.
Chinese First Office Action Issued in Patent Application No. 201380007338.3, dated Sep. 23, 2016, 10 Pages. (with translation).
Chinese Notice of Allowance dated Sep. 5, 2016 cited in Application No. 201310017749.2, 4 pgs. (with translation).
Japanese Office Action in Application 2014555578, dated Oct. 18, 2016, 8 pages.
U.S. Appl. No. 13/351,310, Office Action dated Sep. 19, 2016, 39 pages.
Chinese Office Action in Application 201380007344.9, dated Jan. 11, 2017, 15 pages.
U.S. Appl. No. 13/351,310, Notice of Allowance dated Jan. 31, 2017, 8 pgs.
European Communication in Application 12854863.3, dated Mar. 9, 2017, 8 pages.
Japanese Notice of Allowance in Application 2014555578, dated Feb. 28, 2017, 3 pages. (No English Translation).
European Communication in Application 13644376.8, dated Mar. 28, 2017, 6 pages.
Japanese Office Action in Application 2014555578, dated Jan. 5, 2017, 4 pages.
European Office Action in Application 13743289.4, dated Feb. 14, 2018, 4 pages.
Japanese Office Action in Application 2017-06664, dated Mar. 20, 2018, 6 pages. (MS# 334520-JP-PCD).
U.S. Appl. No. 14/964,014, Office Action dated Apr. 4, 2018, 15 pages. (MS# 334521-US-CNT).
"Supplementary Search Report Received in European Patent Application No. 12854863.3", dated Jun. 10, 2015, 9 Pages. (MS# 334521-US-NP).
"Final Office Action Issued in U.S. Appl. No. 14/964,014", dated Nov. 2, 2018, 14 Pages. (MS# 334521-US-CNT).
"Office Action Issued in Japanese Patent Application No. 2017-066664", dated Oct. 1, 2018, 6 Pages. (MS# 334520-JP-PCD).
"Non Final Office Action Issued in U.S. Appl. No. 14/964,014", dated Apr. 25, 2019, 13 Pages. (MS# 334521-US-CNT).
"Non Final Office Action Issued in U.S. Appl. No. 15/588,910", dated Jun. 21, 2019, 15 Pages.
"Office Action Issued in Korean Patent Application No. 10-2014-7021310", dated Jun. 17, 2019, 12 Pages.

* cited by examiner

EXTENSION ACTIVATION FOR RELATED DOCUMENTS

RELATED APPLICATIONS

This application is a continuation application of U.S. patent application Ser. No. 13/361,097 (now U.S. Pat. No. 9,449,112), entitled "EXTENSION ACTIVATION FOR RELATED DOCUMENTS," filed on Jan. 30, 2012, the entire disclosure of which is hereby incorporated herein by reference.

Related U.S. patent application Ser. No. 13/361,140 (now U.S. Pat. No. 9,256,445), filed on Jan. 30, 2012 and entitled "Dynamic Extension View With Multiple Levels of Expansion," assigned to the assignee of the present application, is hereby incorporated by reference in its entirety.

Related U.S. patent application Ser. No. 13/361,219 (now U.S. Pat. No. 8,843,822), filed on Jan. 30, 2012 and entitled "Intelligent Prioritization of Activated Extensions," assigned to the assignee of the present application, is hereby incorporated by reference in its entirety.

BACKGROUND

Contextual extensions may complement a document reading experience by showing additional information relevant to the content of the document. Some extensions may only be displayed when appropriate, such as when some key information is found in the document. Conventional systems rely on scanning a single document and activating only when a specific criterion is located in that document. In some situations, however, key contextual information may have been included in another document, such as a previous email in a thread of multiple replies.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Extension activation may be provided. Upon receiving a new document associated with a plurality of related documents, extension trigger conditions may be evaluated. In response to determining that an extension trigger is satisfied, a user interface element associated with the extension trigger may be displayed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
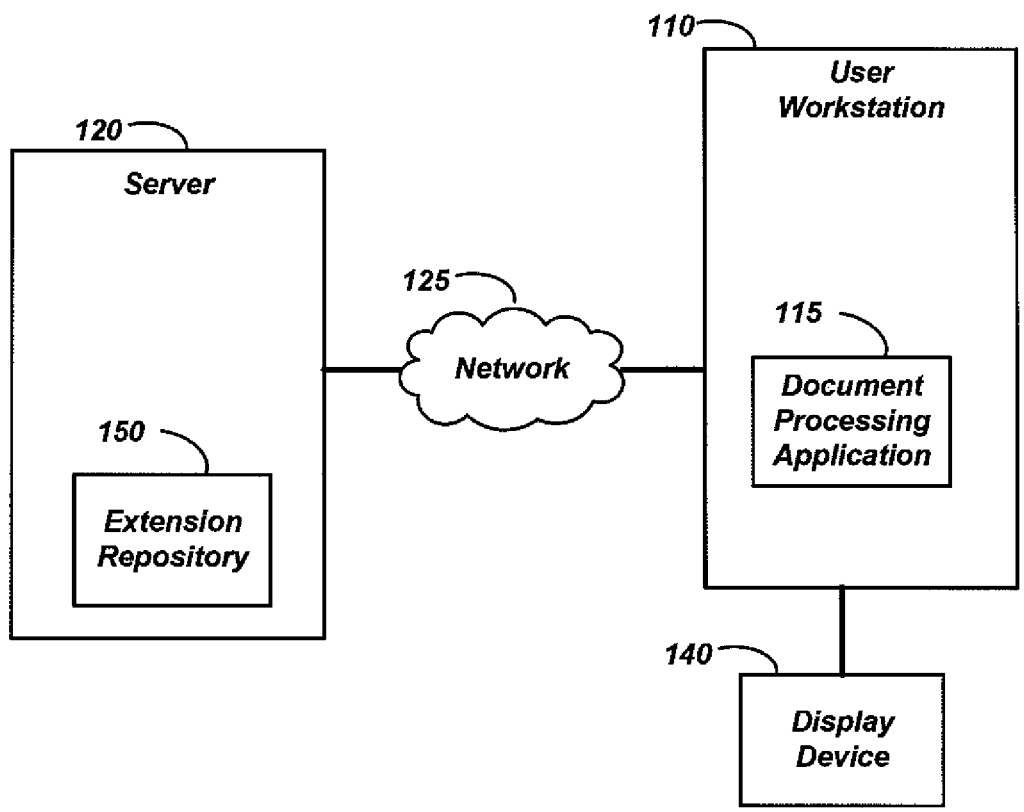
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

An email conversation may be comprised of several emails. Each reply in the conversation may quote some and/or all the body of the message to which it is a reply. If a contextual extension activates on information found in the entire body of a message, then it may also activate on subsequent replies to that message. Sometimes, this is a desirable behavior, such as mapping an address, but in other cases this behavior is undesirable, such as meeting time suggestions for a time that has already passed. In the latter case, it may be preferable if information is only extracted from the reply message (e.g., the text that was typed as a reply) and not the quoted body (e.g., the text from previous messages). Extension activation rules may permit extension developers to specify where to look for relevant information, either in the full document body (e.g., reply text & quoted body of an e-mail) and/or chain of related documents (e.g., a web page and its linked pages) and/or just the document's newly added content. Furthermore, when a list of documents (e.g., a list of message threads in an e-mail application) are displayed, extensions may be activated according to triggering conditions in a particular document, portion thereof, and/or an entire chain of related documents.

Extensions may comprise HTML and/or JavaScript modules that may execute in a sandboxed user interface window. Such extensions may be attached to a currently viewed item (e-mail, contact, task, etc.) and/or may float separately in the user interface environment. Extensions may have varying levels of data access to a user's data (i.e., mail items, contacts, calendar items, tasks, etc.), and may connect with external web services to integrate contextually with that data. For example, a maps extension may display a map of an address detected in the currently viewed message and/or a customer relationship management (CRM) extension may display CRM data about the sender of a currently viewed message.

When creating an application extension, developers may specify where to look for relevant information to determine whether the extension should be activated. Such configuration information may be stored in a manifest file associated with the extension. For example, for e-mail documents, the message's subject, reply body and/or full body may be configured.

The manifest file may comprise information that describes the extension, like its name and version, configuration data, and/or rules that the software application may apply to determine whether the extension should be shown to the end-user. The manifest's information may be subject to modification, such as by an information technology engineer, updates from the extension's author, updates to the software application itself, explicit changes by a user of the extension, and/or heuristically learned behaviors related to the user's interactions with the extension. For example, if the user consistently activates the extension manually to operate on data located in previous messages in the e-mail thread while the developer's rules specify that the extension should only activate based on newly added data (e.g., reply messages), the activation rules may be modified to activate the extension based on all data in the thread in order to alleviate the user's having to manually activate the extension.

FIG. 1 is a block diagram of an operating environment 100 for providing a dynamic extension view comprising a user workstation 110. User workstation 110 may comprise a document processing application 115 and may be operative to interact with a server 120 via a network 125. Server 120 may be operative to execute a plurality of applications and/or services. Document processing application 115 may comprise, for example, a word processing, spreadsheet, presentation, web browser, e-mail and/or other application. User workstation 110 may be operative to output application data and/or user interfaces to a display device 140, such as a monitor and/or touchscreen. User workstation 110 may comprise, for example, an electronic communications device such as a computer, laptop, cellular and/or IP phone, tablet, game console and/or other device. Document processing application 115 may be operative to communicate with server 120 and receive access to a plurality of extensions as configured in an extension repository 150. Extension management application 130 may be operative to provide information technology (IT) administrators with a centralized interface for managing extension settings and access permissions on a per-user, user group, and/or organization wide basis.

Figure 2A:
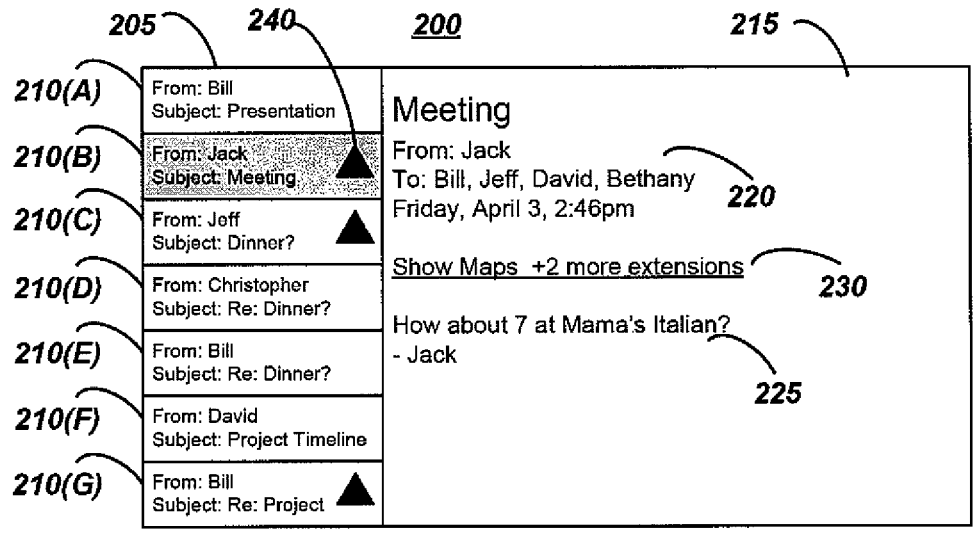
FIGS. 2A-2B are block diagrams of a user interface for providing a dynamic extension view.

FIG. 2A is a block diagram of a user interface 200 for providing dynamic extension views. User interface 200 may comprise a conversation pane 205 comprising a plurality of messages 210(A)-(G). User interface 200 may highlight a selected message, such as message 210(B), and display additional data associated with the selected message in a message pane 215. For example, message pane 215 may display user interface elements such as a message header 220 and a message text 225. Message pane 215 may further comprise UI element 230 that may indicate that extensions associated with the message are available. For each of plurality of messages 210(A)-(G), an entry point, such as entry point UI element 240 associated with message 210(B), may be displayed that lets the end-user know that the message has activated extensions. If no extensions are activated for the message, the entry point may not be shown.

UI element 230 may list the name of an available extension and may also indicate the number of additional extensions that are available. For example, if only one extension is available, UI element 230 may read: "Show <extension name>." If more than one extension is available, UI element 230 may read: "Show <extension name>+N more extensions." When UI element 230 is clicked by a user, an extension pane may be expanded as illustrated in FIG. 2B, below, and display the content of the extension that is explicitly named in the entry point.

Figure 2B:
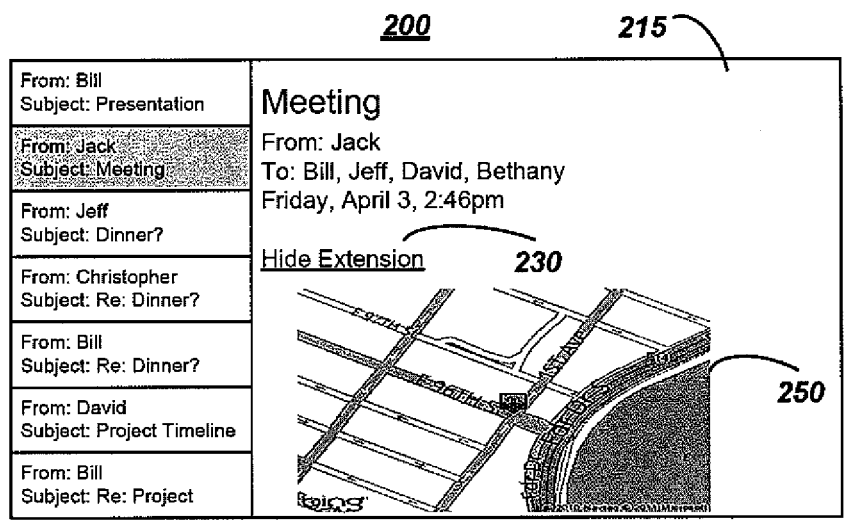

FIG. 2B is a block diagram of user interface 200 illustrating an expanded extension pane 250. UI element 230 may changes into "Hide extensions," which, when selected, may collapse extension pane 250. If more than one extension is activated and/or displayed, extension pane 250 may display a tabular interface that allows the end-user to switch between extensions. Consistent with embodiments of the invention, the tabular interface may be displayed instead of the "Show . . . " entry point, a single extension +a "Show all" command that reveals additional extensions may be displayed, and/or extensions may be displayed in a separate UI element (e.g., another window) instead of showing them inline in message pane 215.

Figure 3:
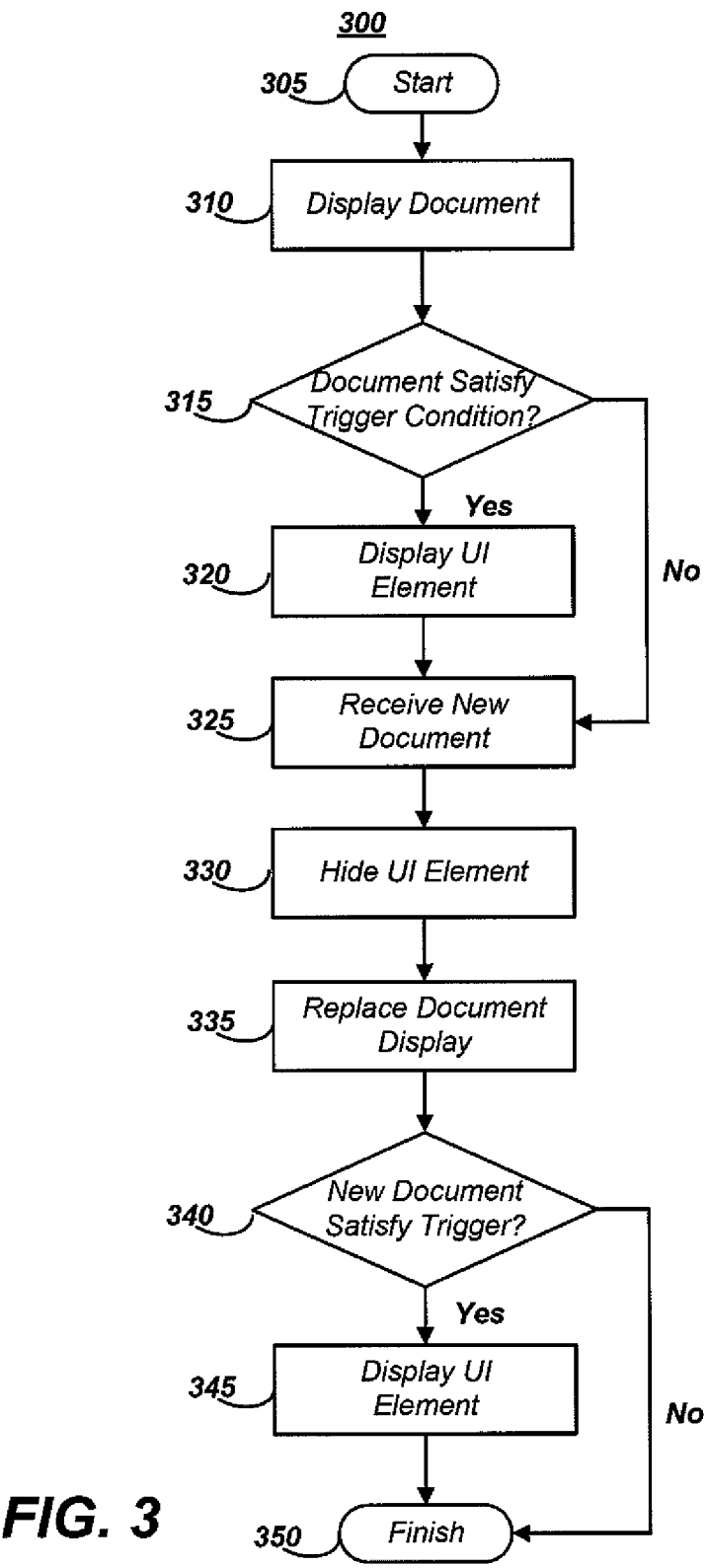
FIG. 3 is a flow chart of a method for providing extension activation.

FIG. 3 is a flow chart setting forth the general stages involved in a method 300 consistent with an embodiment of the invention for providing application extension activation. Method 300 may be implemented using a computing device 400 as described in more detail below with respect to FIG. 3. Ways to implement the stages of method 300 will be described in greater detail below. Method 300 may begin at starting block 305 and proceed to stage 310 where computing device 400 may display at least one document of a plurality of related documents. For example, the plurality of related documents may comprise an email message thread, a tree of hyperlinked web pages, a set of documents each associated with a common project, a plurality of word processing documents, a plurality of spreadsheet documents, a plurality of presentation documents, and/or a plurality of documents of differing types.

Method 300 may then advance to stage 315 where computing device 400 may determine whether a first extension trigger condition associated with at least one first application extension of a plurality of application extensions is satisfied. For example, an extension trigger condition may be associated with a displayed content element of the displayed at least one document (e.g., text in the document), a reference to at least one second document of the plurality of related documents (e.g., a hyperlink), a metadata element associated with the displayed at least one document, and a format of the displayed at least one document (e.g., font and/or style information, inclusion of a signature and/or address block).

If the extension trigger is satisfied, method 300 may advance to stage 320 where computing device 400 may display a first user interface element associated with the at least one first application extension associated with the first extension trigger proximate to the displayed at least one document. For example, an extension trigger may detect an address in the content of the document and display a map extension within the document under and/or next to the address information. Extensions may also be displayed in a separate user interface element, such as a new window. The user interface element may also comprise an indicator that the extension is available.

Method 300 may then advance to stage 325 where computing device 400 may receive a new document associated with the plurality of related documents. For example, a new email reply to a message thread may be received.

Method 300 may then advance to stage 330 where computing device 400 may remove the first user interface element associated with the first application extension. For example, the currently displayed application extension may be hidden. An indicator element, (e.g., an icon indicating that the extension associated with the previous document is still available) may be displayed on and/or proximate to the previous document.

Method 300 may then advance to stage 335 where computing device 400 may replace the displayed at least one document with a display of the new document. For example, the newly received email message may be displayed in a document window.

Method 300 may then advance to stage 340 where computing device 400 may determine whether the new document satisfies at least one second extension trigger condition associated with at least one second application extension of a plurality of application extensions. For example, the new document may be scanned for triggering conditions, inclusive of the triggering condition satisfied by the previous document, as described above with respect to stage 315.

In response to determining that the at least one second extension trigger is satisfied, method 300 may then advance to stage 345 where computing device 400 may display a second user interface element associated with the at least one second application extension associated with the second extension trigger proximate to the displayed new document. For example, a meeting scheduler extension may be displayed in response to determining that a proposed meeting time trigger is satisfied by the new document's contents. Method 300 may then end at stage 350.

An embodiment consistent with the invention may comprise a system for providing application extension activation. The system may comprise a memory storage and a processing unit coupled to the memory storage. The processing unit may be operative to receive a new document associated with a plurality of related documents, determine whether an extension trigger condition is satisfied, and, in response to determining that the extension trigger is satisfied, display a user interface element associated with the extension trigger. The extension trigger may be satisfied by the new document and/or any of the other of the plurality of related documents. The processing unit may be operative to display the user interface element inside a user interface frame associated with the at least one of the plurality of related documents. The processing unit may be further operative to determine whether a plurality of extension trigger conditions are satisfied, wherein each of the extension trigger conditions is associated with one of a plurality of application extensions and, if so, identify at least one of the plurality of application extensions to display, and display the user interface element associated with the at least one of the plurality of application extensions.

Another embodiment consistent with the invention may comprise a system for providing application extension activation. The system may comprise a memory storage and a processing unit coupled to the memory storage. The processing unit may be operative to display at least one of a plurality of related documents, determine whether the displayed at least one document satisfies an extension trigger condition, and, in response to determining that the displayed at least one document satisfies an extension trigger condition, display a user interface element associated with an application extension proximate to the displayed at least one of the plurality of related documents. The extension trigger condition may be defined in an extension manifest associated with the application extension and may be associated with, for example, a displayed content element of the displayed at least one document, a reference to at least one second document of the plurality of related documents, a metadata element associated with the displayed at least one document, and a format of the displayed at least one document. The processing unit may be further operative to determine whether the displayed at least one of the plurality of related documents is no longer displayed and, if so, determine whether a manifest associated with the application extension comprises a display rule. In response to determining that the manifest associated with the application extension does not comprise the display rule, the processing unit may be further operative to remove the displayed user interface element associated with the application extension. Otherwise, the processing unit may be further operative to modify the display of the displayed user interface element associated with the application extension according to the display rule. The processing unit may be further operative to determine whether the displayed at least one document satisfies a plurality of extension trigger conditions, each of which comprises a priority and is associated with at least one of a plurality of application extensions and, if so, display an application extension of the plurality of application extensions associated with the extension trigger condition of the satisfied plurality of extension trigger conditions comprising a highest priority.

Yet another embodiment consistent with the invention may comprise a system for providing application extension activation. The system may comprise a memory storage and a processing unit coupled to the memory storage. The processing unit may be operative to display at least one document of a plurality of related documents, determine whether a first extension trigger condition associated with at least one first application extension of a plurality of application extensions is satisfied, and, in response to determining that the first extension trigger is satisfied, display a first user interface element associated with the at least one first application extension associated with the first extension trigger proximate to the displayed at least one document. The processing unit may be further operative to receive a new document associated with the plurality of related documents, remove the first user interface element associated with the first application extension, replace the displayed at least one document with a display of the new document, determine whether the new document satisfies at least one second extension trigger condition associated with at least one second application extension of a plurality of application extensions, and in response to determining that the at least one second extension trigger is satisfied, display a second user interface element associated with the at least one second application extension associated with the second extension trigger proximate to the displayed new document.

Figure 4:
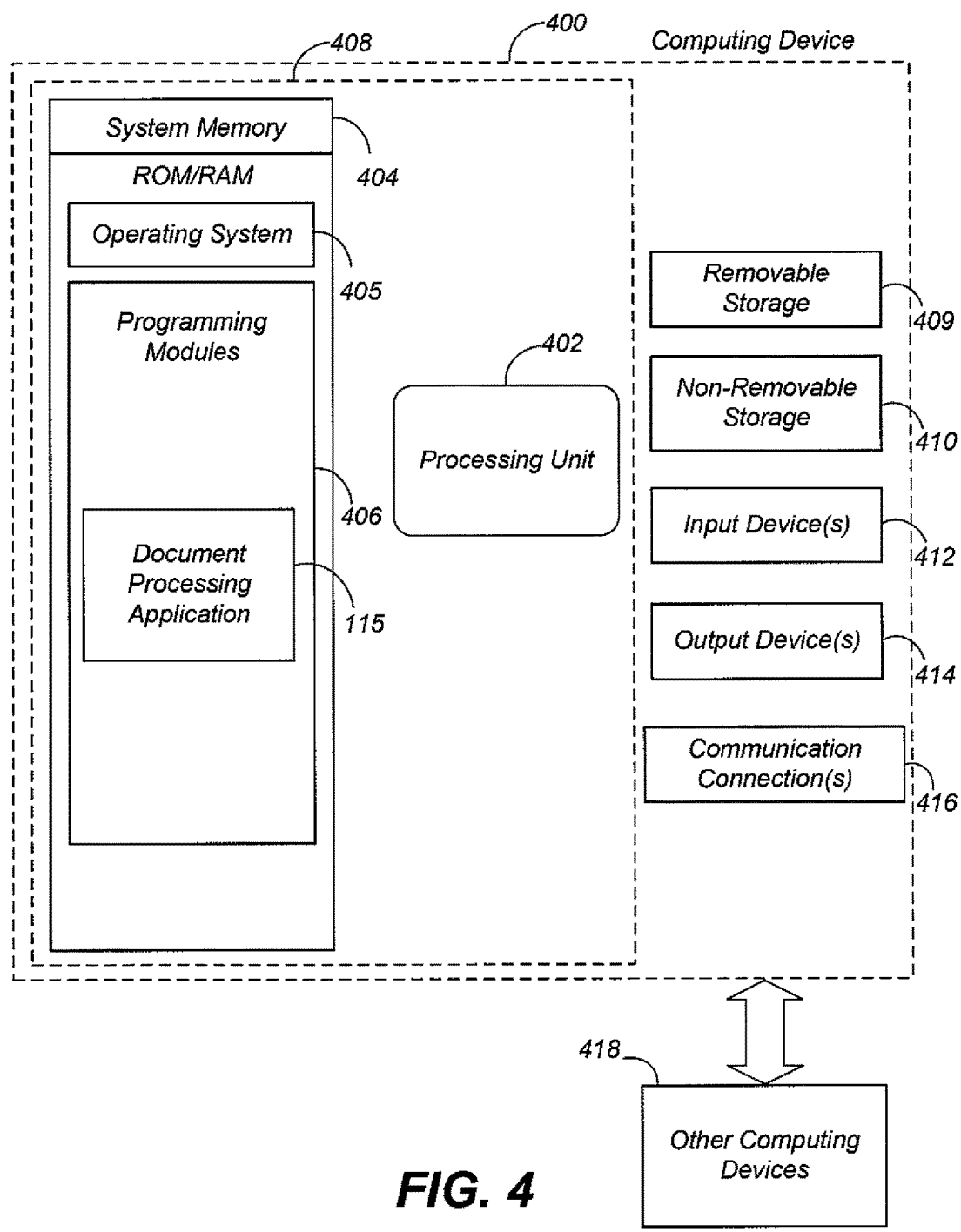
FIG. 4 is a block diagram of a computing device.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 4 and the associated descriptions provide a discussion of a variety of operating environments in which embodiments of the invention may be practiced. However, the devices and systems illustrated and discussed with respect to FIG. 4 are for purposes of example and illustration and are not limiting of a vast number of computing device configurations that may be utilized for practicing embodiments of the invention, described herein.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g., random access memory (RAM)), non-volatile (e.g., read-only memory (ROM)), flash memory, or any combination. System memory 404 may include operating system 405, one or more programming modules 406, and may include document processing application 115. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, a capture device, etc. A capture device may be operative to record a user and capture spoken words, motions and/or gestures made by the user, such as with a camera and/or microphone. The capture device may comprise any speech and/or motion detection device capable of detecting the speech and/or actions of the user. For example, the capture device may comprise a Microsoft® Kinect® motion capture device comprising a plurality of cameras and a plurality of microphones. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 may perform processes and/or methods as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each and/or many of the components illustrated above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any component of operating environment 100 may operate via application-specific logic integrated with other components of the computing device/system on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

The invention claimed is:

1. A method for providing application extension activation, the method comprising:
    enabling display of an item corresponding to each of a plurality of related documents in a list of items;
    receiving a new document associated with the plurality of related documents and enabling display of a new item corresponding to the new document in the list of items;
    determining that at least one of a plurality of extension trigger conditions for the new document is satisfied by content of a second document of the plurality of related documents within the list of items;
    in response to determining that the at least one extension trigger condition is satisfied by the content of the second document, enabling display of an entry-point user interface (UI) element on the new item corresponding to the new document in the list of items, wherein enabling display of the entry-point UI element indicates that an application extension is activated in the new document based on the at least one extension trigger condition being satisfied; and
    in response to receiving a selection of the new item corresponding to the new document in the list of items, enabling display of the new document including a user interface element representing the application extension associated with the at least one extension trigger condition.

2. The method of claim 1, wherein each extension trigger condition of the plurality of extension trigger conditions has a relative priority.

3. The method of claim 2, the method further comprising:
    determining that at least one other of the plurality of extension trigger conditions is satisfied by metadata associated with the new document;
    identifying a highest priority extension trigger condition from among the at least one extension trigger condition satisfied by the content of the second document and the at least one other extension trigger condition satisfied by the metadata of the new document; and
    enabling display of the new document including a user interface element representing an application extension associated with the highest-priority extension trigger condition.

4. The method of claim 1, wherein the plurality of related documents comprises a plurality of email messages.

5. The method of claim 1, wherein the plurality of related documents comprises different document types.

6. The method of claim 1, wherein the plurality of related documents is associated with a common project.

7. The method of claim 1, wherein the plurality of related documents comprises a plurality of web pages associated by a plurality of hyperlinks.

8. The method of claim 1, further comprising enabling display of the user interface element proximate to the new document.

9. The method of claim 1, further comprising enabling display of the user interface element inside a user interface frame associated with the new document.

10. A computer system for providing application extension activation, comprising:
  a processor; and
  a memory storing computer-executable instructions that when executed by the processor cause the computer system to:
    enable display of an item corresponding to each of a plurality of related documents in a list of items;
    receive a new document associated with the plurality of related documents and enable display of a new item corresponding to the new document in the list of items;
    determine that at least one of a plurality of extension trigger conditions for the new document is satisfied by context content of a second document of the plurality of related documents within the list of items;
    in response to determining that the at least one extension trigger condition is satisfied by the content of the second document, enable display of an entry-point user interface (UI) element on the new item corresponding to the new document in the list of items, wherein enabling display of the entry-point UI element indicates that an application extension is activated in the new document based on the at least one extension trigger condition being satisfied; and
    in response to receiving a selection of the new item corresponding to the new document in the list of items, enable display of the new document including a user interface element representing the application extension associated with the at least one extension trigger condition.

11. The computer system of claim 10, wherein enabling display of the user interface element further comprises:
  enable display of a user interface frame comprising a name of the application extension and a number corresponding to the at least one extension trigger condition that is satisfied by the second document.

12. The computer system of claim 10, the computer-executable instructions further causing the computer system to:
  determine that at least one other extension trigger condition is satisfied comprising:
    determine that the at least one other extension trigger condition is associated with a metadata element associated with the new document; and
    determine, based at least in part on the metadata element, that the at least one other extension trigger condition is satisfied.

13. The computer system of claim 10, wherein the plurality of related documents comprises a plurality of email messages.

14. The computer system of claim 10, wherein the plurality of related documents comprises a plurality of web pages associated by a plurality of hyperlinks.

15. The computer system of claim 10, the computer-executable instructions further causing the computer system to:
  modify at least one other extension trigger condition based on evaluating user interaction, wherein user interaction comprises at least one of: activation of an application extension and making a change to an application extension.

16. The computer system of claim 15, wherein modifying the at least one other extension trigger condition comprises updating a priority of the at least one other extension trigger condition.

17. The computer system of claim 16, wherein updating the priority of the at least one other extension trigger condition causes display of a user interface element associated with the at least one other application extension.

18. A computer having a memory comprising computer-executable instructions that when executed by a processor cause the computer to:
  enable display of an item corresponding to each of a plurality of related documents in a list of items;
  receive a new document associated with the plurality of related documents and enable display of a new item corresponding to the new document in the list of items;
  evaluate one or more documents other than the new document to determine that at least one of a plurality of extension trigger conditions for the new document is satisfied by context content of a second document of the plurality of related documents within the list of items;
  in response to determining that the at least one extension trigger condition is satisfied by the content of the second document, enable display of an entry-point user interface (UI) element on a new item corresponding to the new document in the list of items, wherein enabling display of the entry-point UI element indicates that an application extension is activated in the new document based on the at least one extension trigger condition being satisfied; and
  in response to receiving a selection of the new item corresponding to the new document in the list of items, enable display of the new document including a user interface element representing the application extension associated with the at least one extension trigger condition.

19. The computer of claim 18, wherein each extension trigger condition of the plurality of extension trigger conditions has a relative priority.

20. The computer of claim 19, the computer-executable instructions further causing the computer system to:
  determine that at least one other of the plurality of extension trigger conditions is satisfied by the metadata associated with the new document;
  identify a highest priority extension trigger condition from among the at least one extension trigger condition satisfied by the content of the second document and the at least one other extension trigger condition satisfied by the metadata of the new document; and
  enable display of the new document including a user interface element representing an application extension associated with the highest-priority extension trigger condition.

* * * * *